United States Patent
Noori et al.

(10) Patent No.: US 9,882,282 B2
(45) Date of Patent: Jan. 30, 2018

(54) WIRELESS CHARGING AND COMMUNICATIONS SYSTEMS WITH DUAL-FREQUENCY PATCH ANTENNAS

(71) Applicant: Apple Inc., Cupertino, CA (US)

(72) Inventors: Basim H. Noori, San Jose, CA (US); Khan M. Salam, Dublin, CA (US); Liang Han, Sunnyvale, CA (US); Matthew A. Mow, Los Altos, CA (US); Mattia Pascolini, San Francisco, CA (US); Ruben Caballero, San Jose, CA (US); Thomas E. Biedka, San Jose, CA (US); Yi Jiang, Sunnyvale, CA (US); Yuehui Ouyang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 14/921,895

(22) Filed: Oct. 23, 2015

(65) Prior Publication Data
US 2017/0117754 A1 Apr. 27, 2017

(51) Int. Cl.
*H01Q 9/04* (2006.01)
*H04W 4/00* (2009.01)

(52) U.S. Cl.
CPC .......... *H01Q 9/0407* (2013.01); *H04W 4/008* (2013.01)

(58) Field of Classification Search
CPC .................................................. H01Q 9/0407
(Continued)

(56) References Cited

U.S. PATENT DOCUMENTS 7,962,186 B2 6/2011 Cui et al.
7,986,279 B2 * 7/2011 Bruno .................. H01Q 1/38
343/700 MS (Continued)

FOREIGN PATENT DOCUMENTS

CN 1248348 A 3/2000
CN 1379922 A 11/2002
(Continued)

OTHER PUBLICATIONS

Nimbark et al., "Design of a Three Port Feed Matching Network for a Dual-Band and Dual-Polarized Rectangular Patch Antenna" Signal Processing and Communications (SPCOM), 2012, International Conference, IEEE, DOI:978-1-4673-2014-6/12.

*Primary Examiner* — Tilahun B Gesesse
(74) *Attorney, Agent, or Firm* — Treyz Law Group, P.C.; G. Victor Treyz; Joseph F. Guihan

(57) ABSTRACT

An electronic device may be provided with wireless circuitry. The wireless circuitry may include one or more dual-frequency dual-polarization patch antennas. Each patch antenna may have a patch antenna resonating element that lies in a plane and a ground that lies in a different parallel plane. The patch antenna resonating element may have a first feed located along a first central axis and a second feed located along a second central axis that is perpendicular to the first central axis. The patch antenna resonating element may be rectangular, may be oval, or may have other shapes. A shorting pin may be located at an intersecting point between the first and second axes. The patch antennas may be used in beam steering arrays. The patch antennas may be used for wireless power transfer at microwave frequencies or other frequencies and may be used to support millimeter wave communications.

13 Claims, 9 Drawing Sheets

(58) Field of Classification Search
USPC .................................. 455/41.1, 41.2, 562.1
See application file for complete search history.

(56) References Cited

U.S. PATENT DOCUMENTS

| | | | |
|---|---|---|---|
| 8,350,771 B1* | 1/2013 | Zaghloul | H01Q 9/0435 |
| | | | 343/700 MS |
| 8,587,488 B2 | 11/2013 | Knudsen et al. | |
| 8,587,493 B2* | 11/2013 | Dickey | H01Q 1/364 |
| | | | 343/700 MS |
| 8,618,985 B2 | 12/2013 | Park et al. | |
| 8,686,906 B2* | 4/2014 | White | H01Q 1/1271 |
| | | | 343/700 MS |
| 9,306,291 B2* | 4/2016 | Lu | H01Q 21/00 |
| 2006/0092076 A1* | 5/2006 | Franson | H01Q 1/3233 |
| | | | 343/700 MS |
| 2007/0046547 A1* | 3/2007 | Crouch | H01Q 3/46 |
| | | | 343/700 MS |
| 2007/0091008 A1* | 4/2007 | Mortazawi | H01Q 3/26 |
| | | | 343/864 |
| 2008/0272857 A1* | 11/2008 | Singh | H01P 1/184 |
| | | | 333/161 |
| 2009/0207090 A1* | 8/2009 | Pettus | H01L 23/66 |
| | | | 343/873 |
| 2009/0322285 A1 | 12/2009 | Hautanen | |
| 2010/0090902 A1* | 4/2010 | Thompson | H01Q 1/40 |
| | | | 343/700 MS |
| 2013/0271321 A1* | 10/2013 | Anderson | H01Q 3/36 |
| | | | 342/368 |
| 2014/0266034 A1 | 9/2014 | Lee et al. | |
| 2014/0266866 A1* | 9/2014 | Swirhun | G01S 7/026 |
| | | | 342/188 |
| 2014/0347233 A1 | 11/2014 | Mahanfar et al. | |
| 2015/0070228 A1* | 3/2015 | Gu | H01Q 1/2283 |
| | | | 343/727 |

FOREIGN PATENT DOCUMENTS

| | | |
|---|---|---|
| CN | 102544756 A | 7/2012 |
| CN | 102984818 A | 3/2013 |
| CN | 104584451 A | 4/2015 |
| DE | 10247522 A1 | 4/2004 |
| JP | 2012518970 A | 8/2012 |
| KR | 101014347 B1 | 2/2011 |
| KR | 10-2012-0032752 A | 4/2012 |
| KR | 101417560 B1 | 7/2014 |

* cited by examiner

WIRELESS CHARGING AND COMMUNICATIONS SYSTEMS WITH DUAL-FREQUENCY PATCH ANTENNAS

BACKGROUND

This relates generally to electronic devices and, more particularly, to electronic devices with wireless circuitry.

Electronic devices often include wireless circuitry. For example, cellular telephones, computers, and other devices often contain antennas and wireless transceivers for supporting wireless communications. Some devices include circuitry to support wireless charging operations.

Challenges can arise in implementing wireless charging and communications system. If care is not taken, sensitivity to antenna misalignment and other issues can make it difficult or impossible to achieve desired levels of performance when integrating antennas and other structures into devices of interest.

It would therefore be desirable to be able to provide systems with improved wireless circuitry.

SUMMARY

An electronic device may be provided with wireless circuitry. The electronic device may use the wireless circuitry to transfer power wirelessly to external equipment or to communicate wirelessly with external equipment. Patch antennas may be used for wireless power transfer at microwave frequencies or other frequencies and may be used to support millimeter wave communications. The patch antennas may be used to form a beam steering array. The wireless circuitry may include adjustable circuitry to steer wireless signals associated with the antenna array.

The patch antennas may include one or more dual-frequency dual-polarization patch antennas. Each patch antenna may have a patch antenna resonating element that lies in a plane and a ground that lies in a different parallel plane. The patch antenna resonating element may be rectangular, may be oval, or may have other shapes. The patch antenna may have a first feed located along a first central axis of the patch antenna resonating element and a second feed located along a second central axis that is perpendicular to the first central axis. A shorting pin may be located at an intersecting point between the first and second axes.

Further features will be more apparent from the accompanying drawings and the following detailed description.

DETAILED DESCRIPTION

Figure 1:
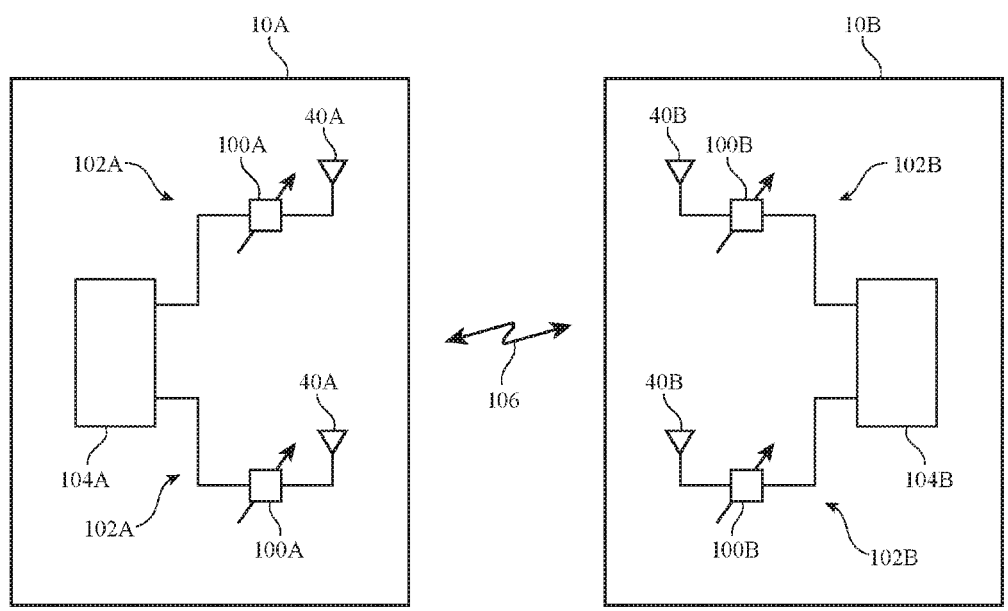
FIG. 1 is a perspective view of an illustrative system with wireless circuitry in accordance with an embodiment.

A system of the type that may support wireless charging and wireless communications is shown in FIG. 1. As shown in FIG. 1, the system may include electronic devices such as electronic devices 10A and 10B. Devices such as 10A and 10B may communicate wirelessly over a wireless communications link. The wireless communications link may be a cellular telephone link (e.g., a wireless link at frequencies of 700 MHz to 2700 MHz or other suitable cellular telephone frequencies), may be a wireless local area network link operating at 2.4 GHz, 5 GHz, or other suitable wireless local area network frequencies, may involve millimeter wave communications (e.g., communications of the type sometimes referred to as extremely high frequency (EHF) communications that involve signals at 60 GHz or other frequencies between about 10 GHz and 400 GHz), may involve WiGig communications (millimeter wave IEEE 802.11 ad communications in a communications band at 60 GHz), or may involve communications at any other wireless communications frequencies (e.g., frequencies above 700 MHz, frequencies below 700 MHz, frequencies above 400 GHz, frequencies below 400 GHz, frequencies from 1-1000 MHz, frequencies above 100 MHz, frequencies above 500 MHz, frequencies above 1 GHz, frequencies from 1-400 GHz, frequencies below 100 GHz, or any other frequencies of interest). Power may also be transferred wirelessly between devices 10A and 10B at these frequencies or any other suitable frequencies. For example, device 10A may transfer power wirelessly to device 10B (e.g., to power device 10B and/or to charge a battery in device 10B). Wireless communications and wireless power transfer operations may be supported using wireless paths such as wireless path 106 of FIG. 1.

Device 10A and/or device 10B may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, devices 10A and 10B may include wireless circuits such as circuit 104A of device 10A and circuit 104B of device 10B. Device 10A may include one or more antennas such as antennas 40A. Each of antennas 40A may be coupled to a respective branch 102A of wireless circuitry between circuit 104A and that antenna 40A. Each circuit branch 102A may include a respective one of adjustable circuits 100A (e.g., adjustable circuitry for making phase and/or magnitude adjustments to the signals conveyed on that branch). Device 10B may include one or more antennas such as antennas 40B that exchange wireless power signals and/or wireless communications signals with antenna(s) 40A via wireless path 106. Each of antennas 40B may be coupled to a respective branch 102B of wireless circuitry between wireless circuit 104B and that antenna 40B. Each circuit branch 102A may include a respective one of adjustable circuits 100A (e.g., adjustable circuitry for making phase and/or magnitude adjustments to the signals conveyed on that branch).

By making phase and/or magnitude adjustments using adjustable circuitry such as the circuitry of circuits 100A and 100B, the antenna arrays of devices 10A and/or 10B may be used to perform beam steering operations associated with the transmission and/or reception of wireless signals. Beam steering operations may, for example, be performed dynamically to ensure that wireless power transfer operations or wireless communications operations are performed effectively over path 106, even as devices 10A and 10B are moved relative to each other and the surrounding environment.

During wireless power transfer operations, wireless power transfer circuitry in circuit 104A in device 10A and circuit 104B in device 10B may be used to transfer power between devices. A first device such as device 10A may use circuit 104A, circuits 100A, and antennas 40A to transfer power wirelessly over path 106. A second device such as device 10B may use antennas 40B, circuits 100B, and circuit 104B to receive the transmitted wireless power. During wireless communications (e.g., communications at extremely high frequencies or other suitable frequencies), device 10A may transmit wireless signals to device 10B over path 106. Device 10A may, for example, use circuit 104A, adjustable circuits 100A, and antennas 40A to transmit wireless communications signals that are received by device 10B using antennas 40B, adjustable circuits 100B, and circuit 104B.

Figure 2:
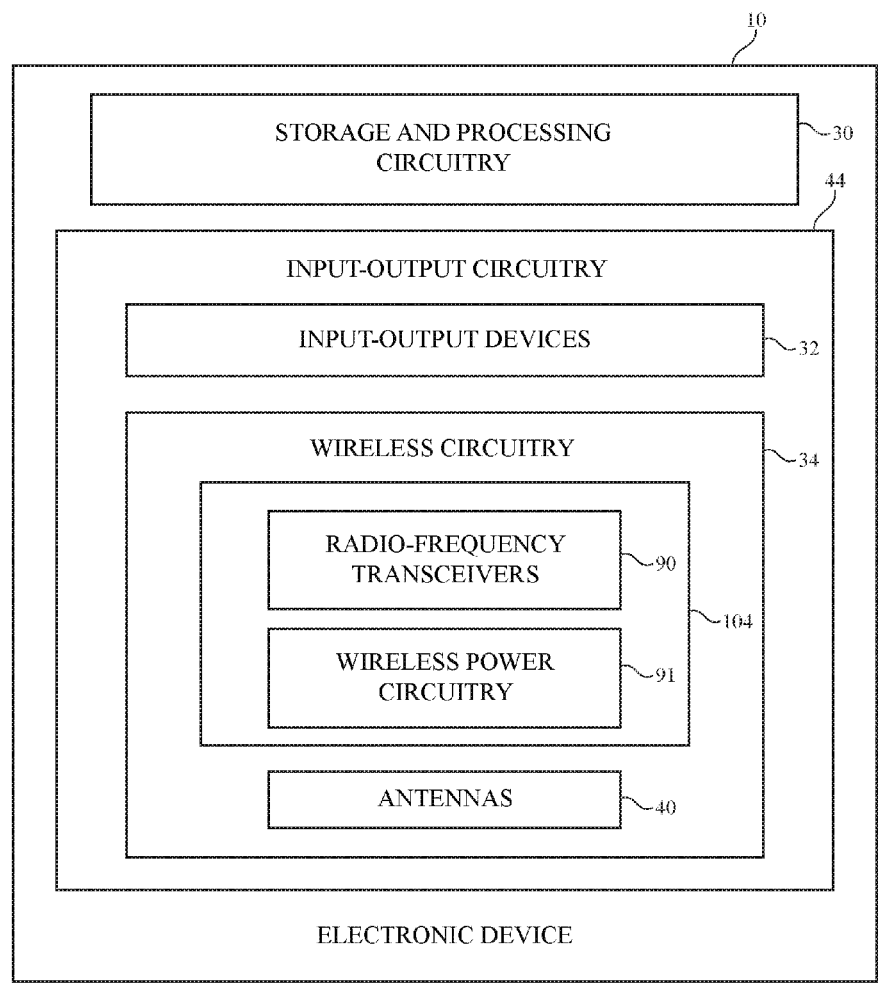
FIG. 2 is a schematic diagram of illustrative circuitry for use in electronic devices in a system with wireless capabilities in accordance with an embodiment.

A schematic diagram of illustrative circuitry of the type that may be used in devices such as devices 10A and 10B is shown in FIG. 2. As shown in FIG. 2, circuitry 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of circuitry 10. This processing circuitry may be based on one or more microprocessors, microcontrollers, digital signal processors, baseband processor integrated circuits, application specific integrated circuits, etc.

Storage and processing circuitry 30 may be used to run software on devices 10A and/or 10B such as internet browsing applications, voice-over-internet-protocol (VOIP) telephone call applications, email applications, media playback applications, operating system functions, functions related to supporting wireless charging operations, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi® and WiGig), protocols for other short-range wireless communications links such as the Bluetooth® protocol, cellular telephone protocols, MIMO protocols, antenna diversity protocols, satellite navigation system protocols, etc.

Circuitry 10 may include input-output circuitry 44. Input-output circuitry 44 may include input-output devices 32. Input-output devices 32 may be used to allow data to be supplied to device 10A and/or 10B and to allow data to be provided from device 10A and/or 10B to external devices. Input-output devices 32 may include user interface devices, data port devices, and other input-output components. For example, input-output devices may include touch screens (i.e., displays with touch sensors), displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether a device is mounted in a dock, and other sensors and input-output components.

Input-output circuitry 44 may include wireless circuitry 34. Wireless circuitry 34 may include wireless circuitry 104 (sometimes referred to as transmitter circuitry, receiver circuitry, transceiver circuitry, etc.) for supporting wireless charging (e.g., using wireless power circuitry 91) and/or wireless communications (e.g., using wireless communications circuitry 90). Circuitry 104 may perform the functions of circuitry 104A, 104B, 100A, and 100B of FIG. 1. Wireless circuitry 104 may be formed from one or more integrated circuits, may include power amplifier circuitry, low-noise input amplifiers, passive RF components, and/or other circuitry. Circuitry 104 may transmit and/or receive wireless signals over path 106 using one or more antennas 40 (see, e.g., antennas 40A and 40B of FIG. 1).

Wireless communications circuitry 90 may include wireless local area network transceiver circuitry that may handle 2.4 GHz and 5 GHz bands for WiFi® (IEEE 802.11) communications and that may handle the 2.4 GHz Bluetooth® communications band. Circuitry 90 may also include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 90 may handle voice data and non-voice data. Circuitry 90 may include millimeter wave transceiver circuitry that may support communications at extremely high frequencies (e.g., millimeter wave frequencies from 10 GHz to 400 GHz or other millimeter wave frequencies). Circuitry 90 may handle IEEE 802.11 ad (WiGig) communications at 60 GHz (millimeter wave frequencies). If desired, circuitry 90 may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals may be received from a constellation of satellites orbiting the earth.

In satellite navigation system links, cellular telephone links, and other long-range links, wireless signals are typically used to convey data over thousands of feet or miles. In WiFi® and Bluetooth® links and other short-range wireless links, wireless signals are typically used to convey data over tens or hundreds of feet. Extremely high frequency (EHF) wireless transceiver circuitry (e.g., WiGig circuitry) may convey signals over these short distances that travel between transmitter and receiver over a line-of-sight path. To enhance signal reception for millimeter wave communications, phased antenna arrays (e.g., an array of antennas 40A in device 10A and/or an array of antennas 40B in device 10B) and beam steering techniques (e.g., beam steering implemented using adjustable circuits 100A in device 10A and/or adjustable circuits 100B in device 10B) may be used. Antenna diversity schemes may also be used to ensure that the antennas that have become blocked or that are otherwise degraded due to the operating environment of device 10 can be switched out of use and higher-performing antennas used in their place.

Wireless circuitry 34 can include circuitry for other wireless operations if desired. For example, wireless communications circuitry 90 may include circuitry for receiving television and radio signals, paging system transceivers, near field communications (NFC) circuitry, etc.

Antennas 40 in wireless circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Yet another type of antenna may be used for supporting wireless power transfer operations. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include phased antenna arrays for handling millimeter wave communications, wireless power transfer, and other wireless operations.

Transmission line paths may be used to route antenna signals within circuitry 10. For example, transmission line paths may be used to couple antenna structures 40 to circuitry 104. Transmission lines in circuitry 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Circuitry 10 of device 10A and/or device 10B may contain multiple antennas 40 (e.g., one or more antennas 40A and/or one or more antennas 40B). The antennas may be used together or one of the antennas may be switched into use while other antenna(s) are switched out of use. If desired, control circuitry 30 may be used to select an optimum antenna to use in circuitry 10 in real time and/or to select an optimum setting for adjustable wireless circuitry 100A and/or 100B associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40.

In some configurations, antennas 40 may include antenna arrays (e.g., phased antenna arrays to implement beam steering functions). For example, the antennas that are used in handling millimeter wave signals for extremely high frequency wireless transceiver circuits may be implemented as phased antenna arrays. The radiating elements in a phased antenna array for supporting millimeter wave communications may be patch antennas, dipole antennas, or other suitable antenna elements. Transceiver circuitry can be integrated with the phased antenna arrays to form integrated phased antenna array and transceiver circuit modules. Phase antenna arrays may also be used in wireless power transfer operations.

Figure 3:
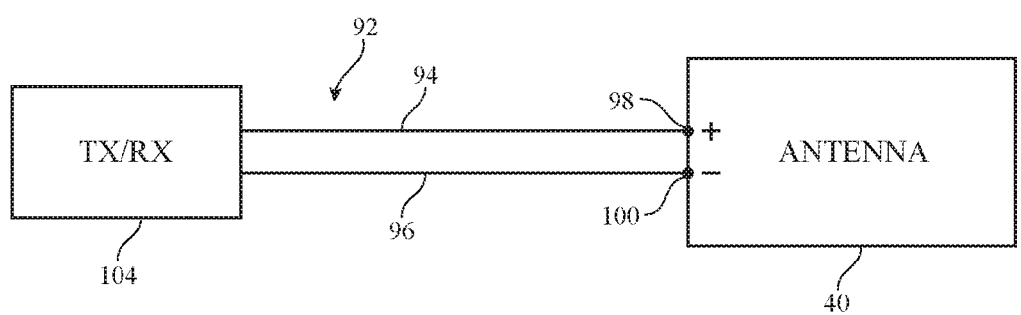
FIG. 3 is a schematic diagram of illustrative wireless circuitry in accordance with an embodiment.

As shown in FIG. 3, wireless circuitry 104 may be coupled to antenna 40 using paths such as path 92 (e.g., a transmission line path). Wireless circuitry 104 may be coupled to control circuitry 30 so that circuitry 104 can be controlled by circuitry 30 during wireless power transfer operations and/or wireless communications operations. Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). A matching network formed from components such as inductors, resistors, and capacitors may be used in matching the impedance of antenna 40 to the impedance of transmission line 92. Matching network components may be provided as discrete components (e.g., surface mount technology components) or may be formed from electronic device housing structures, printed circuit board structures, traces on plastic supports, etc. Components such as these may also be used in forming filter circuitry in antenna 40. Adjustable circuitry such as circuitry 100A and 100B for beam steering may be interposed in paths such as path 92 (e.g., to make phase and/or amplitude adjustments for the signals handled by an associated antenna).

Transmission line 92 may be coupled to antenna feed structures associated with antenna 40. As an example, antenna 40 may form a patch antenna, a dipole antenna, or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used if desired. The illustrative feeding configuration of FIG. 3 is merely illustrative.

Figure 4:
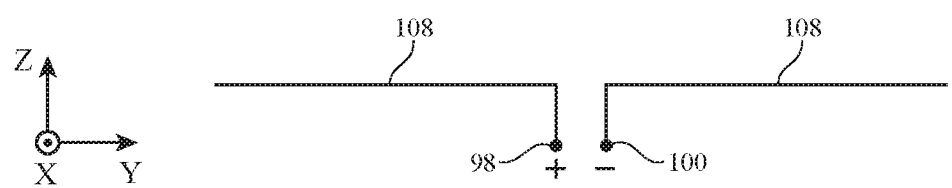
FIG. 4 is a diagram of an illustrative dipole antenna in accordance with an embodiment.

FIG. 4 is a diagram of illustrative dipole antenna structures that may be used in implementing antenna 40. Dipole antenna 40 has an antenna feed formed from feed terminals 98 and 100. Left and right arms 108 extend outwardly from the antenna feed. If desired, dipole antenna 40 may have crossed dipole elements (e.g., a first dipole formed from a pair of arms 108 that extend along the Y dimension of FIG. 4 and a second dipole formed from a pair of arms 108 that extend along the perpendicular X dimension of FIG. 4). Perpendicular dipole elements may be used to provide antenna 40 with the ability to handle antenna signals with orthogonal polarizations.

Figure 5:
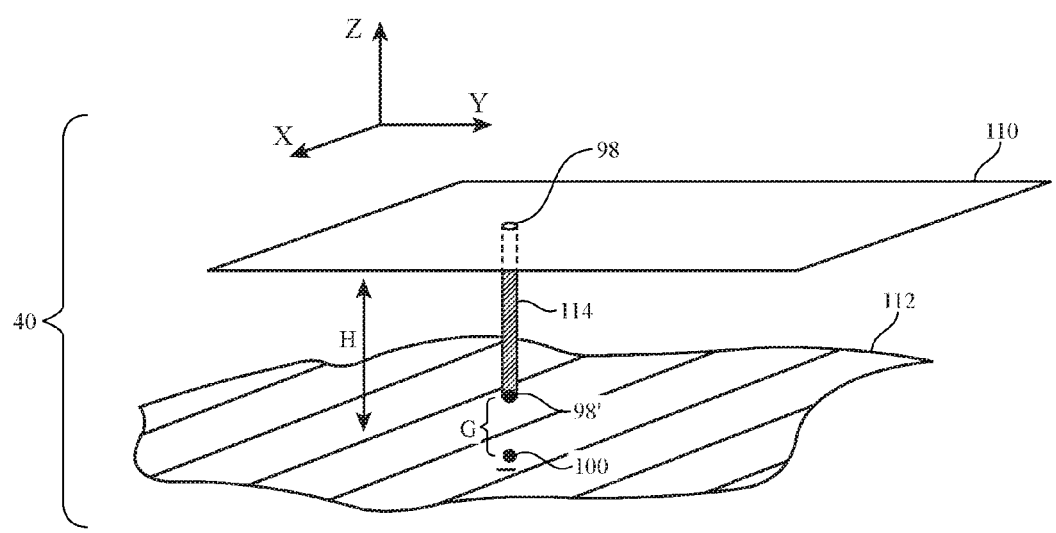
FIG. 5 is a perspective view of an illustrative patch antenna in accordance with an embodiment.

Patch antenna structures may also be used for implementing antenna 40 (e.g., antennas 40A and/or antennas 40B of FIG. 1). An illustrative patch antenna is shown in FIG. 5. As shown in FIG. 5, patch antenna 40 may have a patch antenna resonating element such as patch 110 that is separated from a ground plane structure such as ground 112. Antenna patch resonating element 110 and ground 112 may be formed from metal foil, machined metal structures, metal traces on a printed circuit or a molded plastic carrier, electronic device housing structures, or other conductive structures in an electronic device such as device 10A or 10B 10.

Antenna patch resonating element 110 may lie within a plane such as the X-Y plane of FIG. 5. Ground 112 may line within a plane that is parallel to the plane of antenna patch resonating element (patch) 110. Patch 110 and ground 112 may therefore lie in separate parallel planes that are separated by a distance H. Conductive path 114 may be used to couple terminal 98' to terminal 98. Antenna 40 may be fed using a transmission line with positive conductor coupled to terminal 98' and thus terminal 98 and with a ground conductor coupled to terminal 100. Other feeding arrangements may be used if desired. Moreover, patch 100 and ground 112 may have different shapes and orientations (e.g., planar shapes, curved patch shapes, patch element shapes with non-rectangular outlines, shapes with straight edges such as squares, shapes with curved edges such as ovals and circles, shapes with combinations of curved and straight edges, etc.).

Figure 6:
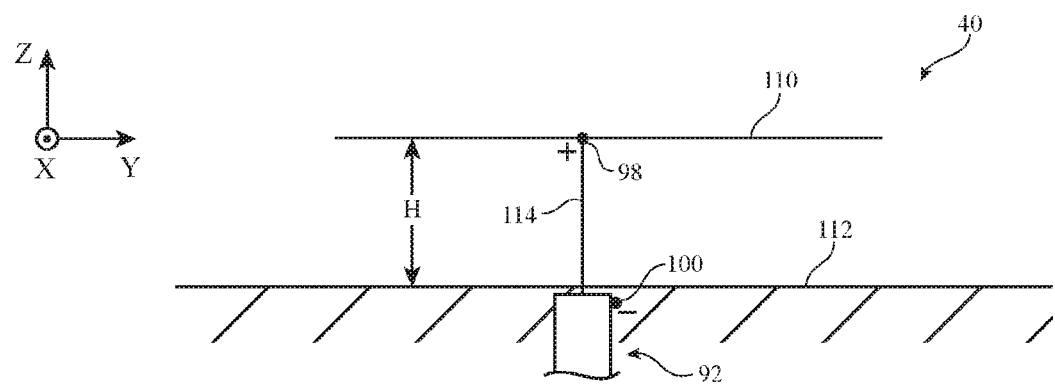
FIG. 6 is a side view of an illustrative patch antenna in accordance with an embodiment.

A side view of a patch antenna such as patch antenna 40 of FIG. 5 is shown in FIG. 6. As shown in FIG. 6, antenna 40 may be fed using an antenna feed (with terminals 98 and 100) that is coupled to a transmission line such as transmission line 92 (e.g., a signal path that forms one of circuit branches 102A of FIG. 1 or one of circuit branches 102B of FIG. 1). Patch element 110 of antenna 40 may lie in a plane parallel to the X-Y plane of FIG. 6 and the surface of the structures that form ground 112 (i.e., ground 112) may line in a plane that is separated by vertical distance H from the plane of element 110. With the illustrative feeding arrangement of FIG. 6, ground conductor 96 of transmission line 92 is coupled to antenna feed terminal 100 on ground 112 and positive conductor 94 of transmission line 92 is coupled to antenna feed terminal 98 via an opening in ground 112 and conductive path 114 (which may be an extended portion of conductor 94). Other feeding arrangements may be used if desired (e.g., feeding arrangements in which a microstrip transmission line in a printed circuit or other transmission line that lies in a plane parallel to the X-Y plane is coupled to terminals 98 and 100, etc.).

Figure 7:
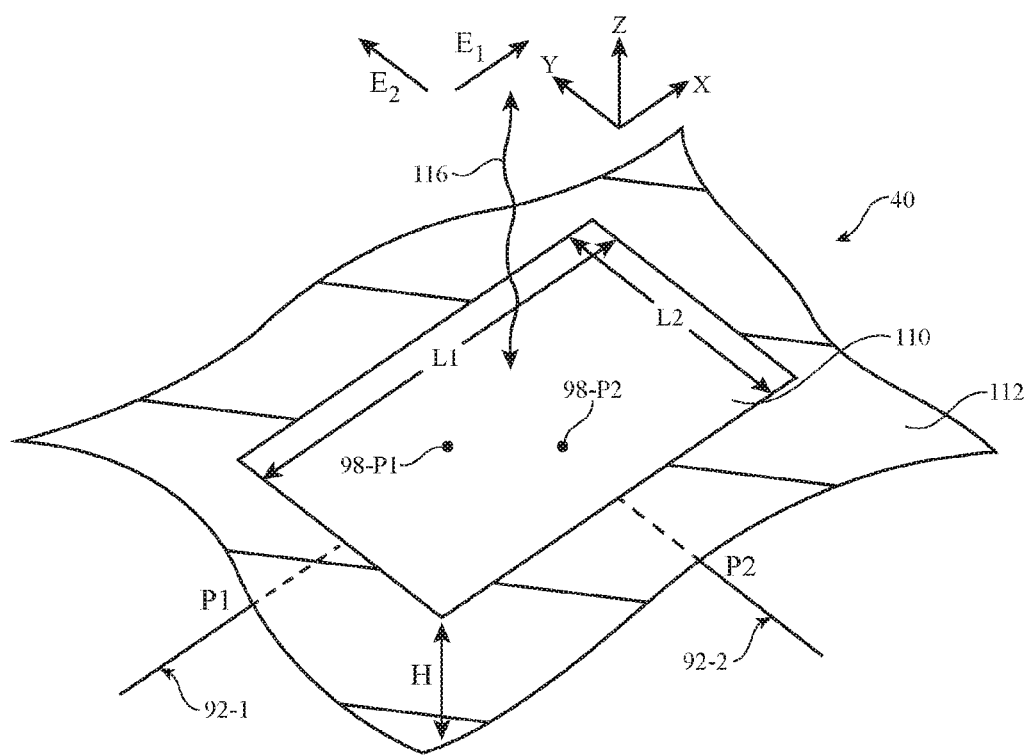
FIG. 7 is a perspective view of an illustrative patch antenna with dual ports in accordance with an embodiment.

To enhance the frequency coverage and polarizations handled by patch antenna 40, antenna 40 may be provided with multiple feeds. An illustrative patch antenna with multiple feeds is shown in FIG. 7. As shown in FIG. 7, antenna 40 may have a first feed at antenna port P1 that is coupled to transmission line 92-1 and a second feed at antenna port P2 that is coupled to transmission line 92-2. The first antenna feed may have a first ground feed terminal coupled to ground 112 and a first positive feed terminal 98-P1 coupled to patch antenna resonating element 110. The second antenna feed may have a second ground feed terminal coupled to ground 112 and a second positive feed terminal 98-P2.

Patch 110 may have a rectangular shape with a pair of longer edges running parallel to dimension X and a pair of perpendicular shorter edges running parallel to dimension Y. The dimension of patch 110 in dimension X is L1 and the dimension of patch 110 in dimension Y is L2. With this configuration, antenna 40 may be characterized by orthogonal polarizations and multiple frequencies of operation.

When using the first antenna feed associated with port P1, antenna 40 may transmit and/or receive antenna signals in a first communications band at a first frequency (e.g., a frequency at which a half of a wavelength is equal to dimension L1). These signals may have a first polarization (e.g., the electric field E1 of antenna signals 116 associated with port P1 may be oriented parallel to dimension X). When using the antenna feed associated with port P2, antenna 40 may transmit and/or receive antenna signals in a second communications band at a second frequency (e.g., a frequency at which a half of a wavelength is equal to dimension L2). These signals may have a second polarization (e.g., the electric field E2 of antenna signals 116 associated with port P2 may be oriented parallel to dimension Y so that the polarizations associated with ports P1 and P2 are orthogonal to each other). During wireless power transfer operations and/or wireless communications using system 10, device 10A and/or device 10B may use one or more antennas such dual-polarization patch antenna 40 of FIG. 7 and may use port P1, port P2, or both port P1 and P2 of each of these antennas. When patch antenna 40 exhibits two orthogonal polarizations, it may be desirable to use an antenna formed from a pair of crossed dipoles (sometimes referred to as a crossed dipole antenna) on one end of path 106 and the patch antenna on the other end of path 106.

In scenarios in which patch 110 has different X and Y dimensions, antenna 40 will exhibit resonances at different frequencies (i.e., antenna 40 will serve as a dual-polarization dual-frequency patch antenna). Dual-polarization dual-frequency patch antennas, crossed dipoles, or other antennas may be used in multiple-antenna arrays (in device 10A and/or device 10B). For example, device 10A and/or device 10B may have an array of antennas 40 that are used in a beam steering arrangement for wireless charging (e.g., wireless charging at 2.4 GHz or other microwave frequencies) or for wireless communications (e.g., millimeter wave communications at 60 GHz such as WiGig communications or communications at other suitable communications frequencies). Dual-polarization dual-frequency patch antennas may be used on one end of path 106 (e.g., in device 10A) or on both ends of path 106 (e.g., in device 10A and 10B).

In the example of FIG. 7, patch element 110 has a rectangular shape with dimensions (length and width) L1 and L2. If desired, patch element 110 may be square (e.g., L1 and L2 may be equal so that patch 110 exhibits a resonance in a communications band at a single frequency) or may have other patch shapes (e.g., shapes with straight edges, curved edges, combinations of straight and curved edges, etc.). In the illustrative configuration of FIG. 8, patch antenna 40 has an oval shape and is associated with two feeds: a first feed having positive antenna feed terminal 98-P1 and a second feed having positive antenna feed 98-P2.

Figure 8:
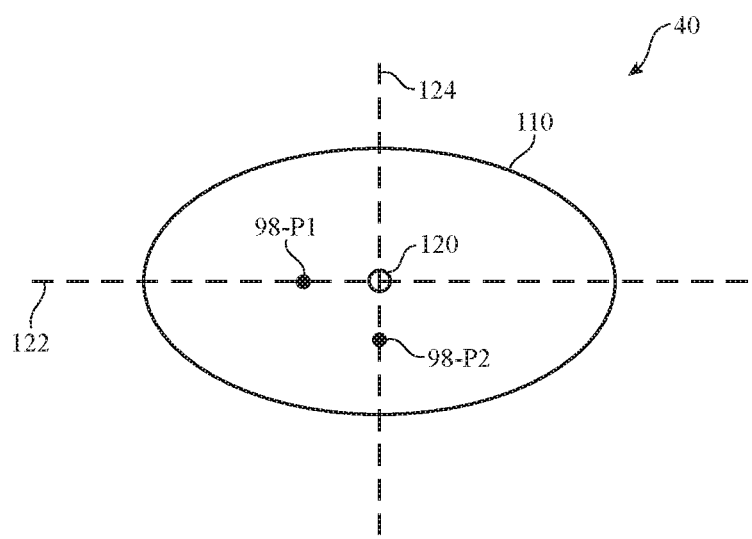
FIG. 8 is a top view of an illustrative oval patch antenna in accordance with an embodiment.

In antenna 40 of FIG. 7, antenna 40 of FIG. 8, and other dual-port patch antennas, the first feed (i.e., the feed associated with first port P1) may be located along a central long axis of patch element 110 (see, e.g., major axis 122 of patch 110 of FIG. 8) and the second feed (i.e., the feed associated with second port P2) may be located along a perpendicular central short axis of patch element 110 (see, e.g., minor axis 124 of FIG. 8). An optional shorting pin may be connected between ground 112 and patch 110 at central point 120 where the longer and shorter central axes of patch 110 intersect to help ensure that antenna impedance is minimized (i.e., near to zero) in the middle of antenna 40.

Figure 9:
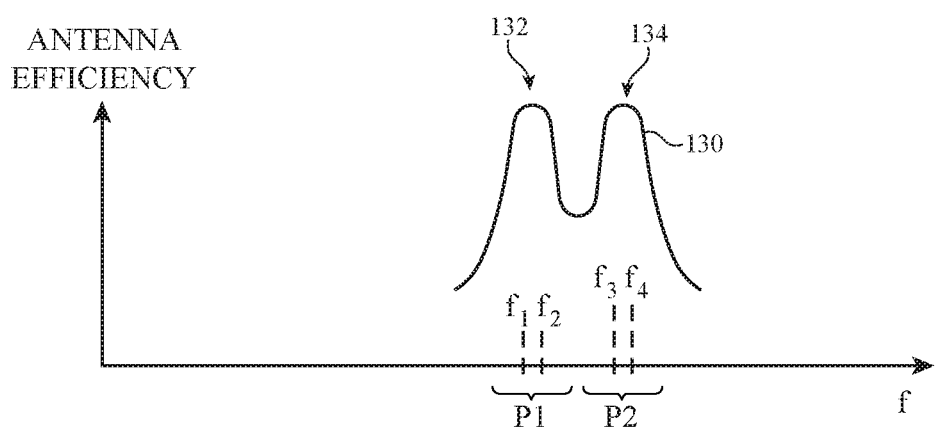
FIG. 9 is a graph in which antenna efficiency has been plotted as a function of frequency for an antenna such as a dual-polarization dual-frequency patch antenna in accordance with an embodiment.

FIG. 9 is a graph in which antenna efficiency has been plotted as a function of operating frequency for an illustrative dual-polarization dual-frequency patch antenna. Efficiency curve 130 may be characterized by first peak 132, which is associated with operations using port P1, and second peak 134, which is associated with operations using port P2. Peaks 132 and 134 may be aligned with desired frequencies of operation for devices 10A and 10B. For example, when supporting millimeter wave communications at 60 GHz, peaks 132 and 134 may be used to cover the four channels associated with IEEE 802.11 ad communications (i.e., IEEE 802.11 ad channel 1 at a frequency f1 of 58.32 GHz, channel 2 at a frequency f2 of 60.48 GHz, channel 3 at a frequency f3 of 62.64 GHz, and channel 4 at a frequency f4 of 64.80 GHz). Advantages of using two closely spaced diversely polarized peaks such as peaks 132 and 134 of curve 130 of FIG. 9 rather than a single wide peak include enhanced efficiency and system bandwidth. Dual-polarization dual-frequency patch antenna 40 may also exhibit enhanced directionality, which helps ensure that beam steering operations will be successful when using an array of antennas 40.

The foregoing is merely illustrative and various modifications can be made by those skilled in the art without departing from the scope and spirit of the described embodiments. The foregoing embodiments may be implemented individually or in any combination.

What is claimed is:

1. An electronic device that communicates wirelessly with an external device, comprising:
    millimeter wave wireless communications circuitry; and
    a dual-polarization patch antenna that is coupled to the millimeter wave wireless communications circuitry and that is configured to communicate wirelessly with the external device, wherein the dual-polarization patch antenna comprises one of an array of dual-polarization patch antennas and the millimeter wave wireless communications circuitry comprises adjustable circuitry that performs beam steering with the array of dual-polarization patch antennas during millimeter wave wireless communications between the millimeter wave wireless communications circuitry and the external device.

2. The electronic device defined in claim 1, wherein the dual-polarization patch antenna has a patch antenna resonating element and a ground, the patch antenna resonating element and the ground lie in separate parallel planes, the patch antenna resonating element has first and second perpendicular central axes, dual-polarization patch antenna has a first feed that lies along the first central axis, and the dual-polarization patch antenna has a second feed that lies along the second central axis.

3. The electronic device defined in claim 2 wherein the millimeter wave wireless communications circuitry communicates in channels at first, second, third, and fourth frequencies and the dual-polarization patch antenna has a first resonance peak that covers the first and second frequencies and a second resonance peak that covers the third and fourth frequencies.

4. The electronic device defined in claim 3 wherein the first, second, third, and fourth frequencies are associated respectively with first, second, third, and fourth frequencies 60 GHz communications channels.

5. The electronic device defined in claim 4 wherein the first, second, third, and fourth frequencies are associated respectively with first, second, third, and fourth IEEE 802.11 ad channels.

6. The electronic device defined in claim 4 wherein the first and second central axes intersect at an intersection point and the dual-polarization patch antenna comprises a shorting pin that shorts the patch antenna resonating element to the ground at the intersection point.

7. An electronic device, comprising:
    wireless circuitry; and
    an array of dual-polarization patch antennas coupled to the wireless circuitry, wherein the wireless circuitry includes adjustable circuitry that performs beam steering with the array of dual-polarization patch antennas, wherein each of the dual-polarization patch wherein the patch antenna resonating element and the ground lie in separate parallel planes, and wherein the patch antenna resonating element has first and second perpendicular central axes and first and second respective different dimensions along the first and second central axes.

8. The electronic device defined in claim 7 wherein each of the dual-polarization patch antennas has a first feed that lies along the first central axis of that antenna and has a second feed that lies along the second central axis of that antenna.

9. The electronic device defined in claim 8 further comprising a display, wherein the wireless circuitry comprises millimeter wave wireless communications circuitry.

10. The electronic device defined in claim 9 wherein the millimeter wave wireless communications circuitry is configured to handle IEEE 802.11 ad channels.

11. An electronic device that communicates wirelessly with an external device, comprising:
    millimeter wave wireless communications circuitry; and
    a dual-polarization patch antenna that is coupled to the millimeter wave wireless communications circuitry and that is configured to communicate wirelessly with the external device, wherein the dual-polarization patch antenna has a patch antenna resonating element and a ground, the patch antenna resonating element has first and second perpendicular central axes, dual-polarization patch antenna has a first feed that lies along the first central axis, and the dual-polarization patch antenna has a second feed that lies along the second central axis.

12. The electronic device defined in claim 11 wherein the patch antenna resonating element and the ground lie in separate parallel planes.

13. The electronic device defined in claim 12 wherein the dual-polarization patch antenna comprises a dual-polarization patch antenna.

* * * * *